Feb. 16, 1943. C. H. WIDMAN 2,311,145
SEAT CONSTRUCTION
Filed May 15, 1939 2 Sheets-Sheet 1
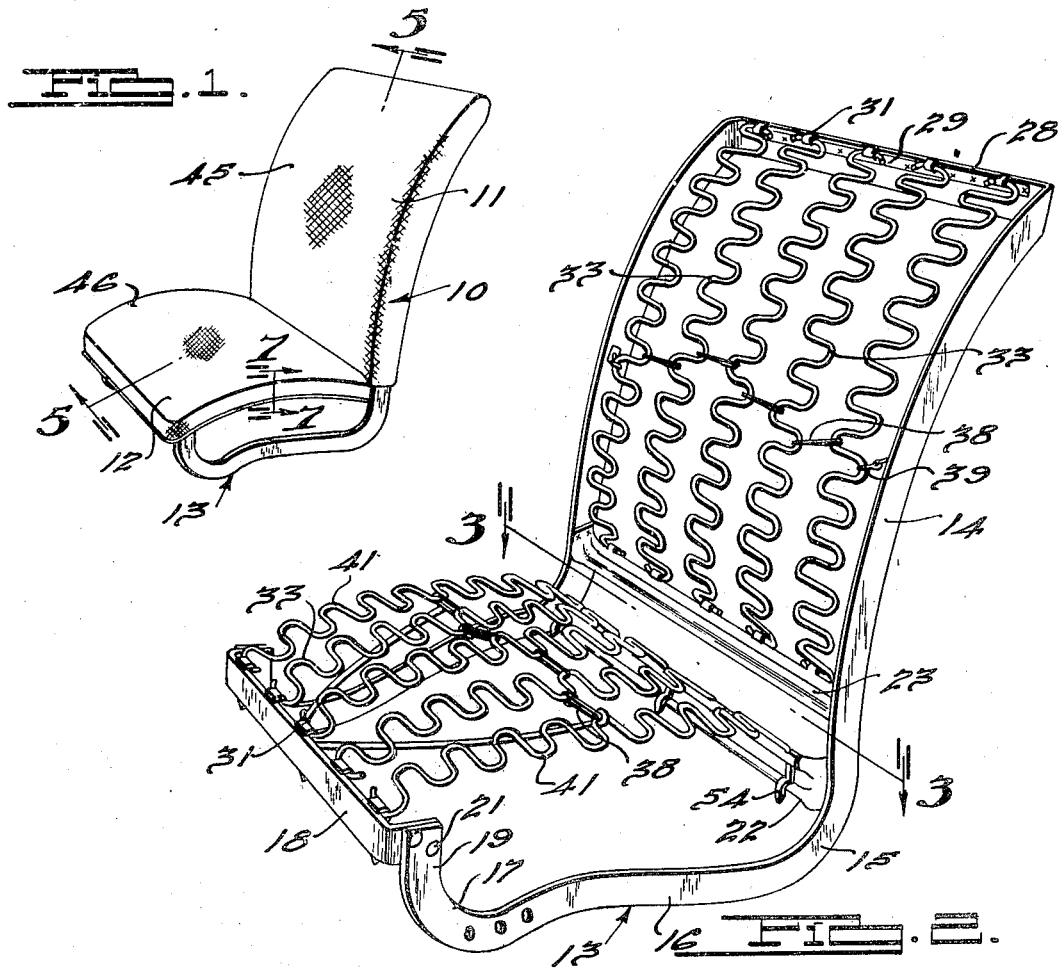
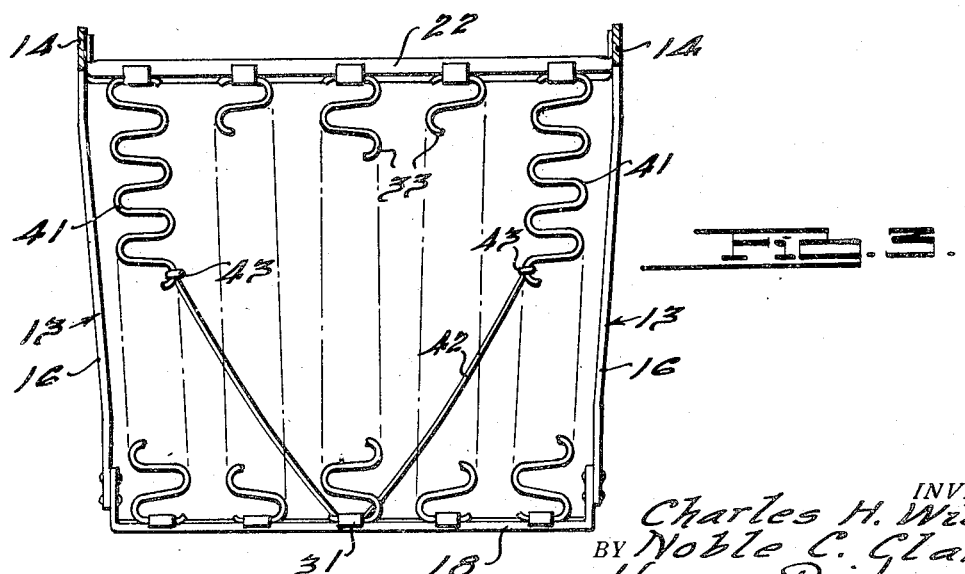
INVENTORS.
Charles H. Widman,
BY Noble C. Clark.
Harness, Dickey & Pierce.
ATTORNEYS.

Feb. 16, 1943.  C. H. WIDMAN  2,311,145
SEAT CONSTRUCTION
Filed May 15, 1939   2 Sheets-Sheet 2
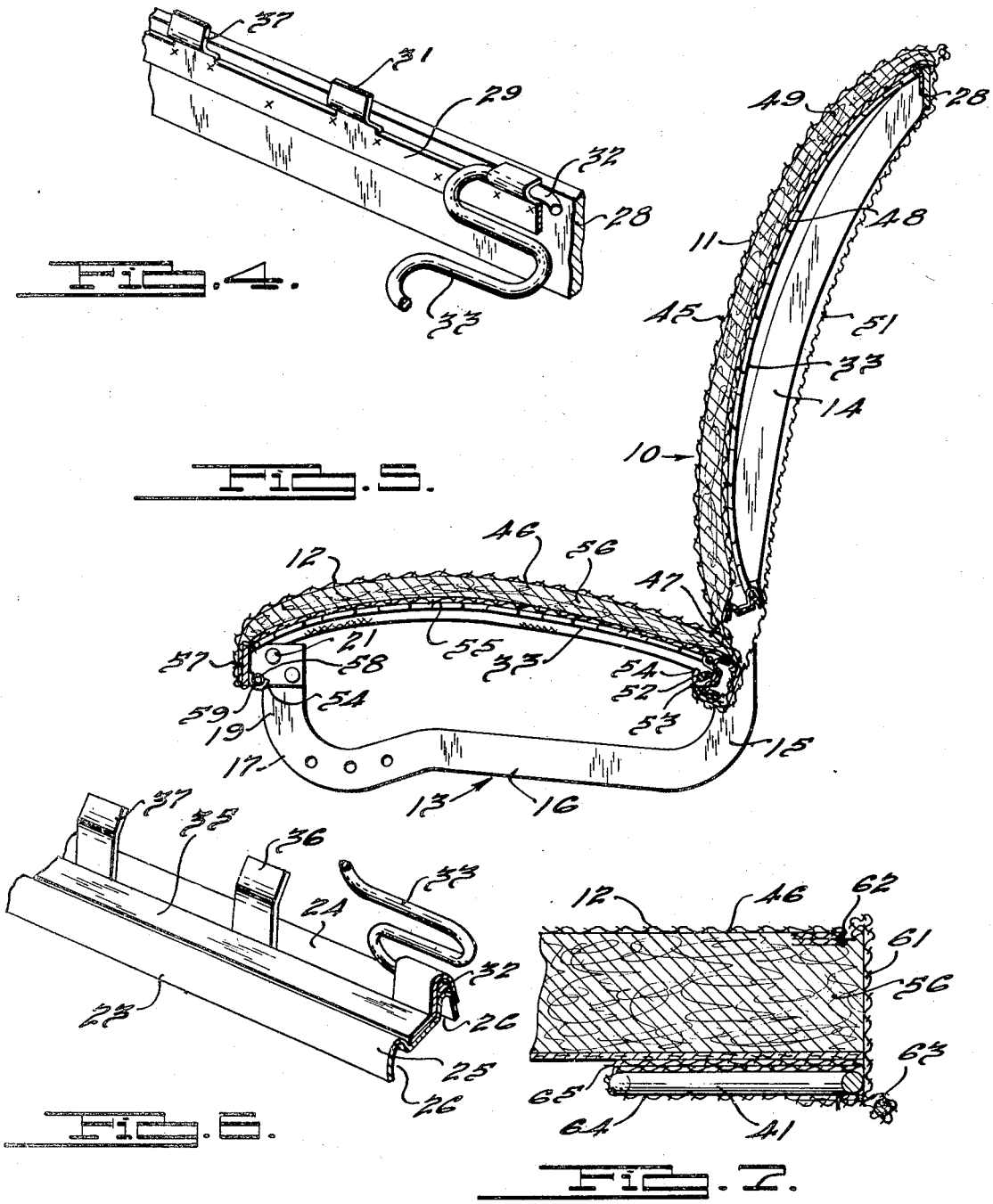
INVENTORS.
Charles H. Widman,
BY Noble C. Clark.
Harness, Dickey & Pierce.
ATTORNEYS.

Patented Feb. 16, 1943

2,311,145

UNITED STATES PATENT OFFICE 2,311,145

SEAT CONSTRUCTION

Charles H. Widman, Detroit, and Noble C. Clark, Pleasant Ridge, Mich., assignors to The Murray Corporation of America, Detroit, Mich., a corporation of Delaware Application May 15, 1939, Serial No. 273,616

10 Claims. (Cl. 155—179)

Our invention relates to seats and particularly to a seat having a unit frame providing supports for spring elements of a seat and back cushion which are covered with upholstering material.

The present invention embodies a frame made of strap material and bent in U-shape to form the back frame and then extended forwardly to form the base and the supporting portion of the seat cushion. Cross-members are secured between the forwardly extending base portion to which spring strips are attached to form the spring surface for the seat cushion. A supporting element is provided across the back portion of the frame spaced from the base of the U-shaped frame portion to which the spring strips are secured to form the spring surface for the back cushion. Preformed upholstering material is drawn over the back frame and spring strips with the lower ends hemmed to receive a rod which is disposed over tabs which are bent thereover to secure the rod and material in position. The seat pad and trim material is disposed over the spring surface of the seat and is preferably secured to the back material at the rear edge and a rod at the front edge secured by tabs which maintain the cloth in stretched position over the seat cushion at the front and rear edges thereof. At the side edges, a strip of material such as cardboard or other stiff material, which is stitched to the ends of the side upholstering strips and by means of which the strips are wrapped around the outermost spring strips of the cushion, thereby retain the material in fixed position. The cross-members on the frame have strips welded thereto from which fingers project for securing the ends of the sinuous spring strips which form spring surfaces on the back seat cushion portions of the frame.

Accordingly, the main objects of our invention are; to provide an inverted U-shaped frame of strap material having the leg portions extend forwardly and upwardly to provide a base; to interconnect the lower sides of the U-shaped frame portion and also the front and rear edges of the base portion to form supports for the spring strips of the back and seat cushions; to provide tabs on the cross-braces for receiving the ends of sinuous spring strips which form a spring surface for the seat and back cushions; to provide padding material in the nature of a pouch which is drawn over the back frame portion and which has a forwardly extended portion which forms an upholstery pad for the seat cushion; to provide anchoring means for the terminal ends of the back cushion upholstery material and the back of the seat pad; to provide rods extending through the upholstery material at the back and front of the seat cushion secured by tongues, which are bent over the rods; to provide a strip of fiber material, cardboard or like material on the side extensions of the seat pad by which the end of the extension is forced around the outermost spring strip of the seat cushion to provide anchor means therefor; and in general to provide a U-shaped frame the legs of which are bent in L formation to form a support for the sinuous spring strips across the back and seat portions thereof, which is upholstered in a new and novel manner, all of which is simple in construction, extremely rigid and economical of manufacture.

Other objects and features of novelty of our invention will be specifically pointed out or will become apparent when referring, for a better understanding of our invention, to the following description taken in conjunction with the accompanying drawings, wherein:

Figure 1 is a perspective view of a seat embodying features of our invention;

Fig. 2 is an enlarged view, similar to that illustrated in Fig. 1, with the upholstering material removed;

Fig. 3 is a sectional view of the structure illustrated in Fig. 2, taken on the line 3—3 thereof;

Fig. 4 is a broken sectional view of the front edge of the seat with the end of a spring strip secured thereto;

Fig. 5 is an enlarged sectional view of the structure illustrated in Fig. 1, taken on the line 5—5 thereof;

Fig. 6 is an enlarged broken view of the bottom cross-member of the back frame portion, illustrating means for securing the ends of the spring strips therein; and, Fig. 7 is an enlarged sectional view of the structure illustrated in Fig. 1, taken on the line 7—7 thereof.

In Figure 1, we have illustrated a seat 10 as embodying a back 11 and a seat portion 12 supported by a frame 13. The frame 13, as illustrated in Figs. 2 to 6 embodies a U-shaped back portion 14, the legs of which are arcuately curved forward at 15 to form the base portions 16 the ends of which are arcuately curved upwardly at 17 to provide legs 19 which support a cross-element 18 which is flanged inwardly at the ends and secured to the ends of the portion 19 by rivets 21 by welding or other means. The frame thus described is constructed preferably from strap material of a width and thickness to provide the necessary rigidity to the resulting frame.

A brace 22 is mounted between the frame sides adjacent to the curved portion 16 to provide a rear support for the springs of the seat cushion. A similar brace 23 extends across the frame above the element 22 to form the lower support for the springs of the back cushion. In cross-section, the elements 22 and 23, as illustrated in Fig. 6, embody an outwardly presented channel portion 24, the flanges of which are reversely bent at 25 to provide spaced channels 26 which add material strength to the braces when constructed of light gauge material.

The base portion 28 of the U frame forms the top support for the springs of the back cushion. The portion 28 along with the front cross-element 18, as illustrated in Fig. 4, has an anchoring element for the springs welded thereto. The anchor element 29 embodies a strip of material having projecting fingers 31 over which the ends 32 of zig-zag spring strips 33 are secured. The zig-zag spring strips are formed of wire bent in zig-zag formation and arched on a curvature of small radius to provide an inherent set against deflection to the spring strips when the ends are extended and anchored. This spring is of the type similar to that illustrated, described, and claimed in the Karl Kaden Patent No. 2,002,399, issued May 21, 1935, under which the present assignee has an exclusive license for the automotive field. After the end 32 of a spring strip 33 has been placed over a projecting finger 31, the finger is bent over the end as illustrated in Fig. 4.

Similar strips 35, as illustrated in Fig. 6, are employed on the braces 22 and 23 for the seat and back cushions, respectively. In this arrangement the fingers 36 project upwardly at an angle to the base portion of the strip 35 which base portion is welded to the web of the braces. After the end 32 of a spring strip 33 has been disposed adjacent to a finger, the finger is bent thereover to securely anchor the end, as illustrated in the figure. The fingers 31 and 36 may have a deflected portion, such as 37, to facilitate the bending of the finger around the end 32 of the spring strip. After the spring strips have been secured to the cross-members, as illustrated in Fig. 2, a plurality of clips 38 preferably join opposite strips interjacent their ends to cause them to function in unison while the outermost strip is secured by clips 39 to the side frame members to limit the inwardly deflection thereof.

Similarly, clips 38 join adjacent spring strips 33 of the seat cushion while the outermost spring strips 41 are urged outwardly by the resilient wire 42 of V-shape. The ends of the wire 42 are coiled at 43 about the convolution of the zig-zag spring strip while the base of the V is pivoted to the cross-element 18 by a finger 31. This arrangement permits the vertical oscillations of the ends of the V-shaped wire 42 while the resiliency of the wire tends to spread the outermost zig-zag strips 41 outwardly. In this manner, a desired width is maintained to the spring surface of the seat cushion without detracting from the resiliency of the surface.

Referring to Figs. 5 and 7 wherein we have illustrated a preferred method of upholstering the back and seat cushion portions of the seat. The trim material 45 for the back and the trim material 46 for the seat portion may be secured together as by stitching along the line 47 with the ends extending downwardly therefrom, or a unit piece of trim material may be employed to form the covering for the seat and back cushion portions with a listing strip attached at the line 47 to extend downwardly to form the anchoring means therefor. Under the back trim portion 45, a spring covering cloth 48, such as burlap, is first employed over which a pad of cotton or like material 49 is provided. A back trim cloth 51 for the rear of the back cushion is stitched to the spring covering element 48, the pad 49, and the front cover material 45. A pouch is formed in this manner in which the frame portion 14 is inserted to have the pad, spring cover, and trim material stretched thereover to provide a smooth cover to the front and rear of the back portion of the seat.

The spring cover 48, the front trim material 45, and the back trim material 51 is hemmed at the bottom, as at 52, in which a rod 53 is inserted to form a holding means for the bottom edge of the material when inserted over the prongs 54 which are secured to the cross-member 22, as illustrated in Fig. 2. The prongs are bent upwardly about the hem and rod to securely retain them in position, as illustrated in Fig. 5.

The forwardly extending trim portion 46 for the seat portion has disposed thereunder a spring cover 55 and a pad 56. The rear end of the trim material 46, and the spring cover 55 is joined to the back cover 45 and spring cover 48 so that when the latter is anchored by the prongs 54, the rear edge of the seat trim material 46 and the spring covering material 55 is also securely anchored to the frame structure. At the forward end, the spring cover material 55 is stitched to the seat portion trim material 46 as at 57, the end of the trim material being hemmed at 58 for the purpose of receiving a rod 59 about which the prongs 54 are bent after the trim material has been forced thereover as illustrated in Fig. 5.

At the side edges, the trim material is provided with a side marginal portion 61 which is secured to the marginal edge of the trim portion 46 as by stitching 62. The edge of the portion 61 is provided with a bead 63 and a cloth strip 64 which are sewn or otherwise secured thereto. Cardboard or similar rigid strips 65 are stitched or otherwise secured to the edge of the cloth strips.

The side marginal portions 61 are maintained over the outer spring strips through the insertion of the secured edges of the cardboard strips 65 over the inner edges of the outer spring strips so that the cloth strip 64 is folded across the underside thereof, as illustrated in Fig. 7. In other words, the cloth strips 64 are drawn inwardly over the outer spring strips and are secured in position by the cardboard strips 65 which are folded over the top of the outer spring strips to have the strips 64 and 65 wrapped thereabout. The strip of cardboard or like material is split to pass over the ends of the wire 42 and in this manner the seat cushion trim material is securely anchored at its sides. In this manner, the spring strips not only form the support for the trim and pad materials, but also provide an anchoring means for the side trim material when wrapped about the outermost strips of the spring surface. Means could be provided for retaining the cardboard strip 65 in place between the pad and the top surface of the outermost spring strips but it was found that sufficient friction was provided to prevent any reverse movement thereof which would release the anchor thus provided for the side trim portion 61.

While I have described and illustrated but a single embodiment of my invention, it will be apparent to those skilled in the art that various changes, omissions, additions, and substitutions may be made therein without departing from the spirit and scope of my invention as set forth in the accompanying claims.

What is claimed is:

1. A seat construction embodying a frame of U shape forming a back frame portion, the legs of which are extended forwardly and upwardly to provide a base support, a pair of cross-braces spanning said back frame portion, a cross-brace spanning the ends of the leg portion, zig-zag spring strips spanning said cross-brace of the leg portion and the lower cross-brace on the back frame portion forming a spring surface for the seat cushion, zig-zag spring strips extending between the upper cross-brace on the back frame portion and the top portion of said back frame portion, trim and padding material formed as a pouch which is drawn over the back frame portion to provide upholstering therefor the ends of which are extended between the cross-braces on the back frame portion, padding and trim material for said seat cushion extending forwardly from the lower edge of said back material from between said cross-braces on the back frame portion, means for anchoring the front end of said seat cushion trim material to the front cross-brace of said seat portion, and means for anchoring the side edges of said trim material about the outermost spring of said seat spring surface.

2. In a seat construction, a seat frame, zig-zag spring strips spanning opposite sides of said frame, trim material disposed over said frame, said trim material being anchored to the frame at the edges supporting the spring strips, and means for anchoring the sides of said trim material about the endmost spring strips.

3. In a seat construction, a seat frame, zig-zag spring strips spanning opposite sides of said frame, trim material disposed over said frame said trim material being anchored to the frame at the edges supporting the spring strips, and means for anchoring the sides of said trim material about the endmost spring strips, said means embodying strips secured to the side edges of the trim material and which are forced between the material and the top surface of the outer spring to wrap the marginal edges of the material thereabout.

4. A seat construction embodying a frame, cross-members spanning opposite sides of said frame, spring strips of zig-zag formation spanning said cross-members, and a V-shaped spring element pivotally anchored at its base to a cross-member and having its arms extended and joined to the outermost spring strip to oppose an inward movement thereof.

5. A seat construction having opposite cross-members with the sides therebetween open, spring strips of zig-zag formation spanning said cross-members, a V-shaped spring element pivotally anchored at its base to a cross-member and having its arms extended and joined to the outermost spring strip to oppose an inward movement thereof, upholstery material disposed over said spring strips, means for anchoring opposite edges of said upholstery to the cross-members, and means for securing the marginal edges of the sides of said trim material about the outermost spring strips.

6. In a seat construction, a frame, zig-zag spring strips extending across opposite sides of said frame, and a V-shaped resilient element having its base pivoted to the frame and having the ends extended and secured to the outermost strips for providing a resistance to inward deflection.

7. In a seat construction, a frame, zig-zag spring strips extending across opposite sides of said frame, a V-shaped resilient element having its base pivoted to the frame and having the ends extended and secured to the outermost strips for providing a resistance to inward deflection, and an upholstering material disposed over said spring strips, opposite edges of which are secured to the base frame and additional opposite edges of which are secured to the outermost spring strips.

8. The combination with a frame providing a spring support for a back and seat cushion, of upholstering material formed in the shape of a punch and drawn over the back portion, additional upholstering material secured to said pouch material and extending forwardly from the bottom edge of said back portion and covering said seat portion, the said seat and back trim material being drawn downwardly between the spring supports, projecting fingers for securing said materials therebetween, and additional fingers at the front edge of the seat portion about which the front marginal edge of the seat cushion trim material is secured, the side edges of said seat trim material being secured to the outermost springs of said seat portion.

9. The combination with spaced interconnected L-shaped frame elements, spring strips arched across the vertical extending back portion of the frame, additional springs and strips arched across the horizontal seat portion of the frame, trim material formed in a pouch drawn over said back portion, additional trim material secured to said pouch material and extending forwardly from the bottom edge of said back trim material over said seat portion, tongues extending from the interconnecting portions of the frame at the front and rear of the base portion thereof, and rods disposed at the front and back edges of said seat trim material and secured by said projecting fingers for anchoring the seat and pouch material.

10. The combination with spaced interconnected L-shaped frame elements, spring strips arched across the vertical extending back portion of the frame, additional springs and strips arched across the horizontal seat portion of the frame, trim material formed in a pouch drawn over said back portion, additional trim material secured to said pouch material and extending forwardly from the bottom edge of said back trim material over said seat portion, tongues extending from the interconnecting portions of the frame at the front and rear of the base portion thereof, and rods disposed at the front and back edges of said seat trim material and secured by said projecting fingers for anchoring the seat and pouch material, the side edges of the seat trim material being wrapped about the endmost spring strips to provide anchoring means therefor.

CHARLES H. WIDMAN.
NOBLE C. CLARK.